United States Patent [19]

del Castillo

[11] 3,916,159

[45] Oct. 28, 1975

[54] RECORD SHEET OR CARD HAVING RAISED PORTIONS WITH GUIDING MEANS

[76] Inventor: Juan M. del Castillo, Risco No. 119, Mexico City, Mexico, 20 D.F.

[22] Filed: Nov. 15, 1974

[21] Appl. No.: 524,331

[52] U.S. Cl................. 235/61.12 N; 84/166; 200/46

[51] Int. Cl.²......................... G06K 19/06; G10F 5/04; H01H 43/08

[58] Field of Search............... 235/61.12 N, 61.12 R, 61.11 A, 235/61.11 C; 200/46; 340/339, 345; 178/17 R, 17 A, 17 B; 84/166

[56] References Cited

UNITED STATES PATENTS

| | | | |
|---|---|---|---|
| 2,273,740 | 2/1942 | Terry | 235/61.12 N |
| 3,542,979 | 11/1970 | Collier | 235/61.11 C |
| 3,612,833 | 10/1971 | Davis | 235/61.11 C |
| 3,714,398 | 1/1973 | Brock | 235/61.11 C |
| 3,765,294 | 10/1973 | Del Castillo | 84/166 |

*Primary Examiner*—Daryl W. Cook
*Attorney, Agent, or Firm*—Karl W. Flocks

[57] ABSTRACT

A control sheet or card having raised portions thereon for operating a contact with the raised portions shaped for guiding and centering the contact as the raised portions pass by the contact with inwardly sloping forward and rear ends on the raised portions.

6 Claims, 5 Drawing Figures

RECORD SHEET OR CARD HAVING RAISED PORTIONS WITH GUIDING MEANS

BACKGROUND OF THE INVENTION

The present invention refers to record sheets or cards for use with the contacts of reading devices and in particular to raised portions thereon with means for guiding the contacts.

In U.S. Pat. No. 3,765,294 of the present inventor entitled "Teaching Device for Attachment to a Keyboard Instrument" there is shown teaching devices for indication of keys on a keyboard instrument which are to be played. These indicators are controlled by readers wherein control sheets or cards pass contacts which are activated by these sheets or cards including those sheets or cards with raised portions thereon. The raised portions illustrated therein are beveled on their forward and rear ends and have a longitudinal center groove connecting the forward and rear ends.

But it has been noted that some contacts require better guidance for centering on these raised portions and this has been provided herein.

SUMMARY OF THE INVENTION

It is an object of the present invention to provide a raised portion on a record card or sheet that will guide a contact as it passes the contact for better centering of the contact in line with the longitudinal centerline of the raised portions.

For the purpose of guiding the contact at least the front beveled end of the raised portion on the record sheet or card has inwardly sloping walls meeting in a centered groove between the sloping walls.

The beveled back end of the raised portion may have a shape similar to the forward beveled end but facing in the opposite direction.

BRIEF DESCRIPTION OF THE DRAWINGS

The above, as well as further objects and advantages which are inherent in the invention, will become apparent from the following description, reference being had to the accompanying drawings wherein.

DESCRIPTION OF THE PREFERRED EMBODIMENTS

Figure 1:
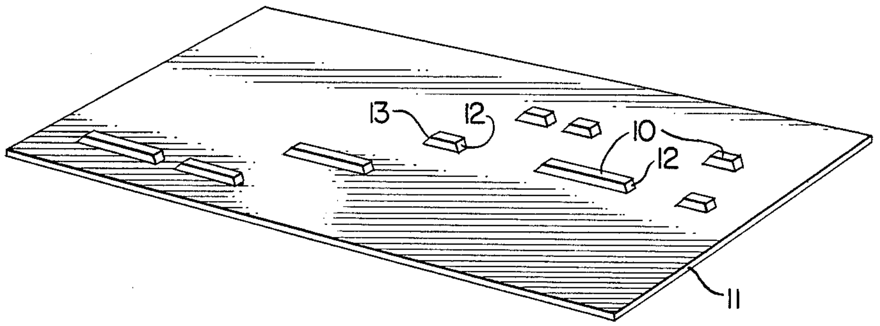
FIG. 1 is a perspective view of a record sheet or card of the present invention.
Figure 2:
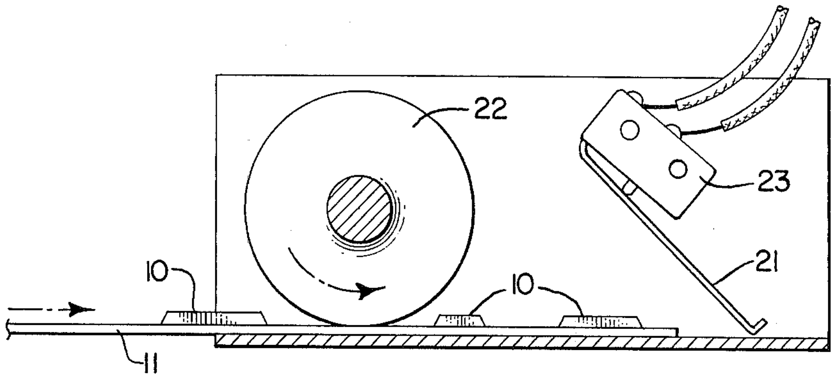
FIG. 2 is an example of a reading head using the sheet or card of FIG. 1.
Figure 3:
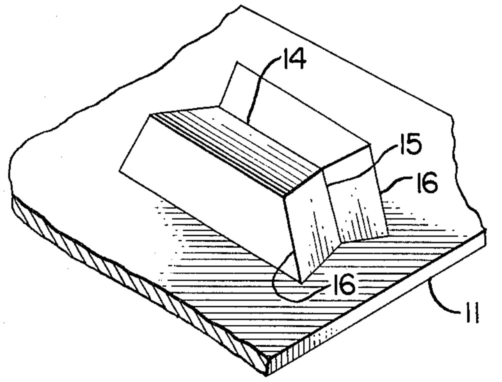
FIG. 3 is an enlarged perspective view of a raised portion on the sheet or card of FIG. 1.

Referring first to FIG. 1, there is shown a perspective view of a record sheet or card 11 with raised portions 10 thereon each having a sloped forward end 12 and a sloped rear end 13. It has been found that when raised portions 10 are utilized on a record sheet or card 11, the reading apparatus used with it will work in a much better manner with the sloped forward ends 12 and sloped rear ends 13 on the raised portions 10. Also these raised portions 10 may have a groove or channel 14 in their top surfaces as shown in FIG. 3 in order to help guide a contact 21 as shown in FIG. 2. There is shown in FIG. 2 a simplified reader with a roller 22 having twin end wheels which contact the longitudinal margins of record sheet or card 11 thereby moving sheet or card 11 beneath contact 21, which actually is usually a row of contacts 21 with one in each of the passing rows of raised portions 10. A single wheel, or several wheels may also be used with roller 22, with the roller 22 connected to a constant speed motor. Upon encountering a raised portion 10, the contact 21 is raised enough to operate microswitch 23 thereby closing the circuit of that particular microswitch to operate an indicator or other device in the circuit.

Figure 4:
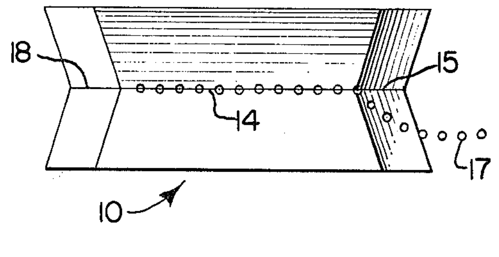
FIG. 4 is a plan view of the raised portion of FIG. 3.

In order to properly guide a contact 21 which may be off-center in respect to the longitudinal center of a raised portion 10, a further improvement has been made in raised portion 10. As shown in FIGS. 3 and 4 a groove 15 is formed in the beveled surface of the forward end 12. Groove 15 is V-shaped with forwardly extending edges 16. When contact 21 approaches a raised portion 10, possibly slightly off-center, it follows a path 17, shown in FIG. 4, onto the inwardly sloping forward end 12 toward the center of groove 15 and then into groove or channel 14 on the top surface of raised portion 10. A similar groove 18 on beveled rear end 13 smoothly guides contact 21 down the rear end 13, still centered and possibly better centered for the next raised portion 10 in that path.

Figure 5:
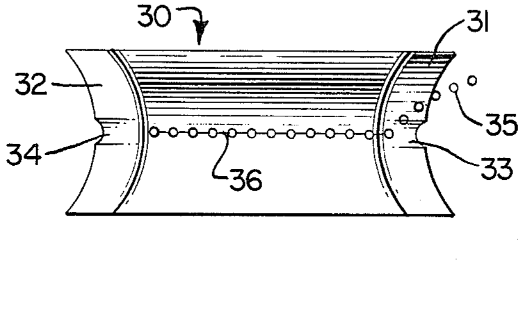
FIG. 5 is a plan view of a modified form of the raised portion of FIG. 3.

FIG. 5 shows in modified form a raised portion 30 with curved beveled forward end 31 and curved beveled rear end 32. The surfaces of both curved beveled ends 31 and 32 are curved concave on raised portion 30. For a better centering guide further centered deeper grooves 33 and 34 are indented in forward and rear ends 31 and 32, respectively. A path 35 which would be followed by a slightly off-center contact 21 is shown in FIG. 5. The path 35 would contact the concave forward end 31 and move into center groove 33, passing to the top surface and following groove or channel 36 along the top surface and down rear end 32 in center groove 34 in a manner similar to the first embodiment of FIGS. 3–4.

In utilizing such raised portions a mold may be made up for a particular pattern, such as a musical pattern, and this mold may be used to stamp out record sheets or cards 11 in large quantities very inexpensively and with more accuracy than might be found in making other types of record cards or sheets. It has also been found that in some cases raised portions 10 or 30 tend to endure due to material used in making these record sheets 11 as well or better than other record cards or sheets such as for example those with apertures therein.

It will be obvious to those skilled in the art that various changes may be made without departing from the scope of the invention and the invention is not to be considered limited to what is shown in the drawings and described in the specification.

What is claimed is:

1. A record sheet means for use with a plurality of contact means, said sheet means moving relatively to said contact means in a predetermined direction, a plurality of raised contact surfaces on said sheet means for coacting with said contact means to activate said contact means, each of said raised contact surfaces comprising beveled downwardly and outwardly sloping sides at the forward and rear ends of said raised contact surfaces, said forward end having an inwardly sloped surface sloping inwardly from the outer edges of the forward end.

2. The record sheet means of claim 1, further characterized by said rear end having an inwardly sloped surface, sloping inwardly from the outer edges of the rear end.

3. The record sheet means of claim 2, further characterized by a V-shaped groove along the top surface of said raised contact surface extending in said predetermined direction between said forward and rear ends.

4. The record sheet means of claim 2, further characterized by said inwardly sloped surfaces on said forward and rear ends being V-shaped grooves with the bottom of the V centered in said sloped surfaces.

5. The record sheet means of claim 2, further characterized by said inwardly sloped surfaces on said forward and rear ends having curved concave surfaces at said ends.

6. The record sheet means of claim 5, further characterized by a centered groove in said curved concave surfaces of said ends extending in said predetermined direction in said curved concave surfaces.

* * * * *